Patented Sept. 16, 1952

2,610,978

UNITED STATES PATENT OFFICE 2,610,978

PRODUCTION OF HALOGEN CONTAINING ORGANIC COMPOUNDS OF PHOSPHORUS

William M. Lanham, Charleston, W. Va., assignor to Union Carbide and Carbon Corporation, a corporation of New York No Drawing. Application December 2, 1949, Serial No. 130,862

10 Claims. (Cl. 260—461)

This invention relates to a novel process for the production of halogen-substituted organic phosphates, phosphonates, amidophosphates and amidophosphonates, and to certain novel halogen-containing organic compounds of phosphorus thereby produced. It has especial utility for the commercial or semi-commercial production of a wide class of these halogen-substituted alkyl phosphorus compounds, including tri-(2-chloroethyl) phosphate, tri-(2-chloropropyl) phosphate and tri-(2,3-dichloropropyl) phosphate. The halogen-substituted alkyl phosphates and phosphonates are useful as plasticizers and for imparting flame-proofing properties to compositions. These compounds and the amido derivatives also are useful as starting materials for other compounds.

Probably the best known of the halogenated alkyl phosphates is tri-(2-chloroethyl) phosphate which long has been recognized as a good solvent for organic derivatives of cellulose, imparting flame-resistance to such compositions. Consequently, the important advance made in the art by this invention will be illustrated particularly with respect to the production of this compound.

Heretofore, two methods for making tri-(2-chloroethyl) phosphate have been known, one of which involves reacting phosphorus oxychloride with ethylene chlorohydrin. This process, while feasible, is not commercially practicable, not only because of the loss of available chlorine as hydrogen chloride in the process but also due to the serious problems arising from the attack of distillation and other equipment by the released acid. Three mols of the acid are released for each mol of the phosphate made.

A second method for producing the aforesaid phosphate involves reacting phosphorus oxychloride with ethylene oxide. No hydrochloric acid formation occurs. However, the reaction does not proceed in the absence of a catalyst at moderate temperatures and pressures, and many of the previously used catalysts seem to interfere seriously with the control of the reaction. Numerous attempts have been made to find a catalyst for this reaction which, while providing good yields of the chlorinated phosphate ester under commercially practicable conditions, will facilitate a simple but full control of this exothermic reaction. Of the many compounds investigated (including aluminum chloride, ferric chloride, iron filings, tin tetrachloride and boron trifluoride), the aluminum chloride and tin tetrachloride, while erratic, were the most promising.

However, when attempting to use aluminum chloride in a large scale reaction at temperatures around 70° C. it was repeatedly observed that the catalyst precipitated in the reaction mixture during the early stages of the reaction. The precipitate re-dissolved after an excess of ethylene oxide had accumulated, but at this stage the reaction tended to go out of control. This occurred even when the reaction temperature was raised from 70° C. to 100° C. in an attempt to prevent this dangerous phenomenon. Various aluminum compounds, including the bromide and mixtures of mono- and di-alkyl aluminum bromides and iodides were tested as catalysts for the reaction. It was found that the formation of an insoluble complex during the course of the reaction was characteristic of the aluminum halides. Tin tetrachloride also proved to be unsatisfactory as a catalyst for the reaction, for here again the apparently completed reaction mixture would develop a delayed heat of reaction and the reaction would go out of control and the mixture would turn black.

According to this invention an oxirane compound of the formula

wherein R is hydrogen or an alkyl, chlorinated alkyl or brominated alkyl radical, is reacted, in the presence as catalyst of certain halogen-containing compounds of titanium and of zirconium, with phosphorus oxychloride or oxybromide, or with corresponding derivatives thereof wherein one or two of such halogen atoms is replaced by a corresponding number of hydrocarbon radicals or halogen-substituted hydrocarbon radicals directly connected to the phosphorus atom—or by similar radicals connected with the phosphorus atom through an oxy oxygen atom—or is replaced by an amido or a mono- or di-alkyl substituted amido radical. The oxirane compound should be substantially free from water; and the compound of phosphorus should be substantially free from hydrogen chloride and water. The reaction proceeds smoothly, with the catalysts exhibiting no tendency to precipitate in the reaction mixture or to interfere with reaction control.

While the process is operative at temperatures as low as 20° C., the reaction preferably is conducted at a temperature within the range between 50° C. and 80° C., at which the reaction proceeds smoothly, especially when using a titanium halide catalyst. If temperatures much below 35° C., i. e., around 25° C.—are maintained, the rate of addition of the oxirane compound has to be closely watched since if it is added too rapidly there is danger that an excess of the oxirane compound may accumulate in the mixture and interfere with the reaction. Temperatures around 100° C. can be used, but those much above 90° C. apparently increase side reactions forming chlorinated hydrocarbons and polyphosphates or phosphonates. The reaction can be conducted at pressures above atmospheric, but this is not necessary.

The amount of catalyst employed can vary considerably. As little as about 0.15% by weight of the catalyst, based upon the phosphorus compound, is sufficient for the reaction between phosphoryl chloride and ethylene oxide to produce tri-(2-chloroethyl) phosphate. At this catalyst concentration the rate of ethylene oxide feed should be sufficiently slow to prevent accumulation of unreacted oxide in the reaction mixture. A catalyst concentration in the range from 0.3% to 1% commonly is used in large scale operations, but larger amounts can be used. Either the technical grade or the commercially pure grade of the catalytic compound can be employed.

Usually a substantial excess of the oxirane compound is employed, ranging from 5% to 50% of the amount theoretically required to insure that all of the halogens directly connected with the phosphorus atom of the phosphorus compound have reacted. However, the amount of the oxirane compound theoretically required can be used. The reaction product then can be used without purification for purposes where traces of the catalyst are not objectionable.

The products of the reaction can be recovered in purified form by any of several procedures. For example, the reaction mixture can be neutralized with an aqueous slurry of calcium or barium carbonate, the mixture filtered, the filtrate fractionally distilled under vacuum, and the desired product separately recovered. In another procedure the reaction mixture is agitated with an aqueous solution of trisodium citrate, disodium tartrate, or potassium sodium tartrate, which form water-soluble complexes with the catalyst, and the organic layer then is washed with water to remove such complexes. The washed product is freed from water by distillation under vacuum. The desired product also can be secured directly from the reaction mixture by fractional distillation under vacuum.

Among novel compounds of the invention are halogen-substituted alkyl derivatives of phosphoric and phosphonic esters and amides of the general formula

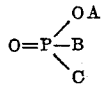

wherein A represents a member of the class consisting of the chlorine-substituted and bromine-substituted alkyl radicals; B represents a radical selected from the chlorine-substituted and bromine-substituted alkoxy and aryloxy radicals, the alkoxy and aryloxy radicals, and the radical —NRR' wherein R and R', respectively, represents a member of the class consisting of hydrogen and the alkyl and aryl radicals; and C represents a member of the class consisting of the alkyl, alkenyl, aryl, aralkoxy, aryloxy and alkaryloxy radicals and the said radical —NRR'.

Novel amidophosphate derivatives of the invention include those having structures of the formula

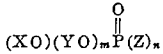

wherein X represents a member of the class consisting of the chlorine-substituted alkyl radicals and the bromine-substituted alkyl radicals; Y represents a member of the class consisting of the chlorine-substituted alkyl and aryl radicals, the bromine-substituted alkyl and aryl radicals, and the alkyl and aryl radicals; Z represents the group —NRR' wherein R and R', respectively, represents a radical selected from the class consisting of hydrogen and the alkyl and aryl radicals; $m$ is zero or 1; and $m+n=2$.

Among the compounds of phosphorus useful in the process are phosphoryl chloride, the chloride-bromides and the bromide; mono- and di-alkyl chlorophosphates and bromophosphates such as dibutyl chlorophosphate, monobutyl dichlorophosphate, di-(2-ethylhexyl) chlorophosphate, and di-(dodecyl) chlorophosphate; the cycloalkyl chloro- and bromophosphates such as di-cyclohexyl chlorophosphate; the aryl and alkaryl chlorophosphates such as diphenyl chlorophosphate, phenyl dichlorophosphate, phenyl dibromophosphate, p-tert-butylphenyl dichlorophosphate, and cresyl dichlorophosphate; halogenated alkyl and aryl chlorophosphates such as 2-chloroethyl dichlorophosphate, di-(2-chloroethyl) chlorophosphate, 2-bromoethyl dibromophosphate, p-chlorophenyl dichlorophosphate, di-(p-chlorophenyl) chlorophosphate; amidophosphoryl halides and alkyl- and aryl-substituted amidophosphoryl halides such as amidophosphoryl dichloride, N,N-diethylamidophosphoryl dichloride, N,N-dibutylamidophosphoryl dichloride, N,N-diphenylamidophosphoryl dichloride and N,N'-diethyldiamidophosphoryl chloride; alkoxy-alkyl, polyalkoxyalkyl, aryloxyalkyl and aryloxypolyalkoxyalkyl halogenated phosphates such as the methoxyethyl, methoxyethoxyethyl, ethoxyethyl, butoxyethyl, phenoxyethyl and phenoxyethoxyethyl mono- and di-chlorophosphates; and the corresponding derivatives of the bromophosphates. Also useful in the process for the production of halogen-containing organic phosphonates are the alkyl-, alkenyl- and aryl-substituted chlorophosphonates, such as methanephosphonyl dichloride, ethanephosphonyl dichloride, benzenephosphonyl dichloride, and 2-propene-1-phosphonyl dichloride.

Oxirane compounds useful include the alkylene oxides such as ethylene oxide, alpha-propylene oxide, isopropyl ethylene oxide, symmetrical dimethyl ethylene oxide, 1,2-butylene oxide, epichlorohydrin, epibromohydrin and epiiodohydrin.

The preferred catalysts are the tetrachlorides and tetrabromides of titanium and zirconium. However, it is possible to use the oxides and those other compounds of these metals capable of forming the halides of these metals when dissolved in the phosphoryl halide or in the substituted halide.

The following examples serve to illustrate the invention. In the examples the parts are given in terms of weight unless otherwise specified.

*Example 1*

To a mixture of 77 pounds of phosphoryl chloride and 0.25 pound of titanium tetrachloride were added 75 pounds (a 9 pound excess) of liquid ethylene oxide over 9.5 hours at such a rate that the kettle temperature was maintained at 50° C.

After maintaining this temperature for another hour, the excess ethylene oxide was removed by fractional distillation at 50° C. under a pressure of 47 mm. of mercury. To the residue was added with agitation one pound of trisodium citrate as a 10% aqueous solution and the mixture then was washed with water to remove the catalyst. The washed organic layer was freed from water by distillation at 100° C. under a pressure of 5 mm. of mercury. The residue of tri-(2-chloroethyl) phosphate was secured in 91% yield, based upon the phosphoryl chloride.

*Example 2*

Over 2 hours 276 parts of ethylene oxide were added through a diffuser into a mixture of 308 parts of phosphoryl chloride and 2 parts of titanium tetrachloride while cooling the reaction mixture to maintain it at 50° C. The excess ethylene oxide was removed by pot distillation at 50° C. under 2 mm. of mercury pressure. The net gain in weight due to the reacted oxide was 275 parts (theory=266 parts). The stripped reaction mixture was stirred with a slurry of 12 parts of calcium carbonate and 30 parts of water for 3 hours to neutralize any acids and precipitate insoluble calcium salts. The mixture then was filtered, and the filtrate was distilled at 150° C. under a pressure of less than 1 mm. of mercury in a molecular type still. The water white distillate, tri-(2-chloroethyl) phosphate, was secured in 89% yield. The chlorine content was 37.10% (theory=37.26%); $n_D^{30°}=1.4698$.

*Example 3*

To a solution of 2 parts of titanium tetrachloride in 307 parts of phosphoryl chloride were slowly added 648 parts of epichlorohydrin while maintaining the reaction mixture at 70° C. The excess epichlorohydrin was removed by distillation at 70° C. under a pressure of 5 mm. of mercury. The stripped reaction mixture was neutralized with an aqueous slurry of calcium carbonate, filtered and stripped under vacuum to a temperature of 78° C. under 0.1 mm. of mercury, and then was distilled at 178° C. under 0.1 mm. of mercury in a molecular type still. A 92% yield of tri-(dichloropropyl) phosphate, based upon the phosphoryl chloride, was secured as distillate. The compound had a chlorine content of 49.17% (theory=49.37%).

*Example 4*

To a stirred solution of 1 part of zirconium tetrachloride in 154 parts of phosphoryl chloride were slowly added 181 parts of ethylene oxide, while maintaining the reaction mixture at 50° C. After completion of the addition of oxide the excess oxide was removed by pot distillation to a kettle temperature of 50° C. under a pressure of less than 5 mm. of mercury. The residual mixture was neutralized with a 10% aqueous solution of trisodium citrate, washed with water and again pot stripped at the aforesaid kettle temperature and pressure. The residual product, tri-(2-chloroethyl) phosphate, was secured in 95% yield, based upon the phosphoryl chloride. It had a refractive index at 30° C. of 1.4701.

*Example 5*

To a solution of 1.5 parts of titanium tetrabromide in 154 parts of phosphoryl chloride were slowly added 150 parts of gaseous ethylene oxide while cooling the mixture to maintain it at around 70° C. The excess ethylene oxide then was removed from the reaction mixture by pot distillation under vacuum to a kettle temperature of 50° C. under 1 mm. of mercury pressure, the stripped mixture was neutralized with dilute aqueous trisodium citrate, washed with water, and then freed from water by pot distillation at 100° C. under 1 mm. of mercury pressure. The residual product, tri-(2-chloroethyl) phosphate, having a refractive index at 30° C. of 1.4703, was secured in 86% yield, based upon the phosphoryl chloride.

*Example 6*

To a mixture of 308 parts of phosphoryl chloride and 2 parts of titanium tetrachloride were added dropwise 365 parts of propylene oxide while cooling to maintain the reaction mixture at 70° C. The mixture was distilled under vacuum to remove excess propylene oxide, and it was found that 354 parts of propylene oxide had reacted (theory=350 parts). The mixture was further stripped at 78° C. under 0.2 mm. of mercury pressure in a molecular type still and then was distilled at 180° C. under 0.1 mm. of mercury in such still. The light yellow distillate, tri-(chloropropyl) phosphate, containing 32.05% chlorine (theory = 32.47%), and having $n_D^{30°}=1.4608$, was secured in 80% yield, based upon the phosphoryl chloride.

*Example 7*

To a mixture of 442 parts of p-nonylphenyl dichlorophosphate and 2 parts of titanium tetrachloride were added 125 parts of gaseous ethylene oxide while maintaining the reaction mixture at 50° C. by cooling. Excess ethylene oxide was removed by distillation at 50° C. under 1 mm. of mercury pressure. The residual mixture was neutralized with aqueous trisodium citrate, washed with water, and stripped of water by heating in a still to a kettle temperature of 100° C. under less than 1 mm. of mercury pressure. The residue product, p-nonylphenyl di-(2-chloroethyl) phosphate, was a light yellow liquid having a chlorine content of 15.69% (theory=16.67%), $$n_D^{30°}=1.4951,$$

and an acidity corresponding to 0.0036 cc. of normal KOH per gram. It was secured in 96% yield.

*Example 8*

Upon adding 139 parts of ethylene oxide in successive portions to an agitated solution of 154 parts of phosphoryl chloride and 1 part of zirconium oxychloride ($ZrOCl_2 \cdot 8H_2O$) while maintaining the mixture at 50° C., and thereafter removing excess ethylene oxide and processing the stripped reaction mixture in the general manner described in Example 2, a yield of 61% of the tri-(2-chloroethyl) phosphate, based upon the phosphoryl chloride, was secured.

*Example 9*

To a vigorously agitated solution of 1.5 parts of titanium tetrachloride in 137 parts of dibutyl bromophosphate (prepared by reacting tributyl phosphite with bromine) were added 62 parts of ethylene oxide while cooling to maintain the mixture at 35° C.–40° C. The reaction mixture then was stripped of excess ethylene oxide by heating up to 56° C. at less than 1 mm. of mercury pressure in a molecular type still, the residue receiver from the still being submerged in a Dry Ice-acetone bath to minimize decomposition of the residual product, 2-bromoethyl dibutyl phosphate, which was obtained in 92% yield, based on the bromophosphate, as a light yellow liquid, $$n_D^{30°}=1.4476,$$

having a bromine content of 24.72% (theory=25.20%).

Example 10

To a solution of 1 part of titanium tetrachloride in 130 parts of N-2-ethylhexylamidophosphoryl dichloride were added 58 parts of gaseous ethylene oxide. During this addition and for an additional 2 hours the reaction mixture was maintained at 70° C. The excess ethylene oxide then was removed by vacuum distillation, the stripped residue was neutralized with aqueous trisodium citrate, washed with water and then distilled under vacuum to a kettle temperature of 100° C. under less than 2 mm. of mercury pressure to remove water. The residual product, di-(2-chloroethyl) N-(2-ethylhexylamido)-phosphate having a refractive index at 30° C. of 1.4649 and a chlorine content of 19.87% (theory=21.22%), was secured in 85% yield, based upon the dichloride starting material.

Example 11

To a solution of 0.5 part of titanium tetrachloride in 95 parts of N,N-diethylamidophosphoryl dichloride, maintained at 50° C. by cooling, were added slowly 58 parts of ethylene oxide. The excess ethylene oxide (13 parts) was removed by pot distillation under vacuum. The residue was fractionally distilled under a pressure of 0.2 mm. of mercury in a molecular type still, providing an 87% yield of di-(2-chloroethyl) N,N-diethylamidophosphate, based upon the substituted phosphoryl dichloride, as a colorless liquid having a refractive index at 30° C. of 1.4592, and distilling at 78° C. under a pressure of 0.2 mm. of mercury, chlorine content, 25.60% (theory=25.50%).

In the practice of this invention, using a small amount of titanium tetrachloride as catalyst, the following products were secured in high yields: n-butyl di-(2-chloroethyl) phosphate, distilling at 100° C. under 0.2 mm. of mercury pressure in a molecular still, and having $n_D^{30°}=1.4498$; cresyl di-(2-chloroethyl) phosphate, distilling at 125° C. under 0.2 mm. of mercury pressure and having $n_D^{30°}=1.5050$; di-(2-chloroethyl) 2-methoxyethyl phosphate, as a water white liquid having $n_D^{30°}=1.4553$; di-(2-chloroethyl) benzenephosphonate, a liquid distilling at 150° C. under 0.1 mm. of mercury pressure in a molecular still, and having $n_D^{30°}=1.5239$ and a chlorine content of 25.00% (theoretical=25.05%); di-(2-chloroethyl) 1-propene-2-phosphonate, distilling at 78° C. under a pressure of 0.2 mm. of mercury in a molecular type still, and having $n_D^{30°}=1.4723$; p-chlorophenyl di-(2-chloroethyl) phosphate, a water white liquid having $n_D^{30°}=1.5157$ and distilling in a molecular type still at 150° C. under less than 1 mm. of mercury pressure; p-tert-butylphenyl di-(2-chloroethyl) phosphate, having $n_D^{30°}=1.5007$ and a chlorine content of 19.5% (theory=19.94%); di-(2-chloroethyl) 2-phenylethyl phosphate, distilling at 150° C., under a pressure of <1 mm. of mercury and having $n_D^{30°}=1.5051$; 2-chloroethyl diphenyl phosphate, distilling at 150° C. under a pressure of 0.2 mm. of mercury in a molecular type still, and having a chlorine content of 11.20% (theory=11.34%) and $n_D^{30°}=1.5360$; di-(dichloropropyl) phenyl phosphate having $n_D^{30°}=1.5170$, a chlorine content of 34.9% (theory=35.81%), and an acidity of 0.004 cc. of normal KOH per gram; di-(2-chloroethyl) phenyl phosphate, distilling at 150° C. under 0.2 mm. of mercury pressure in a molecular type still, and having a chlorine content of 23.7% (theory=23.71%), and $n_D^{30°}=1.5060$; di-(2-chloroethyl) N-butylamidophosphate, having a refractive index at 30° C. of 1.4699, and a chlorine content of 25.37% (theory=25.50%); 2-chloroethyl di-phosphate, boiling at 124° C. under 0.1 mm. of mercury pressure in a molecular type still, and having $n_D^{30°}=1.4632$; and 2-chloroethyl di-(2,3-dichloropropyl) phosphate, boiling at 160° C. under 0.1 mm. of mercury pressure in a molecular type still, and having $n_D^{30°}=1.4918$.

The invention is susceptible of modification within the scope of the appended claims.

I claim:

1. Process for producing halogen-substituted alkyl phosphoric and phosphonic compounds, which comprises reacting at an elevated temperature, in the presence as catalyst of a metal halide of the class consisting of the halides of titanium and zirconium, an oxirane compound of the formula

wherein R is selected from the class consisting of hydrogen and the alkyl, chlorine-substituted and bromine-substituted alkyl radicals, with a compound of phosphorus selected from the class consisting of the phosphorus oxyhalides wherein each halogen has an atomic weight between 35 and 80, and derivatives of such phosphorus oxyhalides wherein one to two of such halogen atoms are replaced by a corresponding number of radicals of the class consisting of the hydrocarbon radicals and halogen-substituted hydrocarbon radicals directly connected to the phosphorus atom through a carbon to phosphorus bond, the same radicals connected with the phosphorus atom through an oxy oxygen atom, and the amido, mono- and di-alkyl substituted amido, and mono- and di-aryl substituted amido radicals.

2. Process for producing halogen-substituted alkyl phosphates, which comprises reacting at a temperature between 20° C. and 100° C., in the presence as catalyst of a metal halide of the class consisting of the halides of titanium and zirconium, an oxirane compound of the formula

wherein R is selected from the class consisting of hydrogen and the alkyl, chlorine-substituted and bromine-substituted alkyl radicals, with a phosphorus oxyhalide wherein each halogen has an atomic weight between 35 and 80.

3. Process for producing halogen-substituted alkyl phosphates, which comprises reacting a phosphorus oxyhalide wherein each halogen has an atomic weight between 35 and 80 with an oxirane of the formula

wherein R is a radical selected from the class consisting of hydrogen, the alkyl groups and the chlorine-substituted and bromine-substituted alkyl groups, at a temperature within the range between 50° C. and 80° C., in the presence as catalyst of a metal halide of the class consisting of the halides of titanium and zirconium.

4. Process for producing tri-(2-chloroethyl) phosphate, which comprises adding successive small amounts of a substantially dry ethylene oxide to phosphoryl chloride which is substantially free from hydrogen chloride and moisture, while maintaining the reaction mixture at a temperature between 50° C. and 80° C., in the presence of titanium tetrachloride.

5. Process for producing halogen-substituted alkyl phosphates, which comprises reacting at temperatures between 20° C. and 100° C., in the presence as catalyst of a metal halide of the class consisting of the halides of titanium and zirconium, an oxirane compound of the formula

wherein R is selected from the class consisting of hydrogen and the alkyl, chlorine-substituted and bromine-substituted alkyl radicals, with a phosphorus oxyhalide wherein each halogen has an atomic weight between 35 and 80, and wherein one to two of such halogen atoms are replaced by a corresponding number of monovalent hydrocarbon residues, each connected with the phosphorus atom through an oxy oxygen atom.

6. Process for producing halogen-substituted alkyl phosphates, which comprises reacting at a temperature between 50° C. and 80° C. in the presence as catalyst of a metal halide of the class consisting of the halides of titanium and zirconium, an oxirane of the formula

wherein R is selected from the class consisting of hydrogen and the alkyl, chlorine-substituted and bromine-substituted alkyl radicals, with a derivative of a phosphorus oxyhalide wherein each halogen has an atomic weight between 35 and 80, and wherein one to two of such halogen atoms are replaced by a corresponding number of monovalent halogen-substituted hydrocarbon residues, each connected with the phosphorus atom through a corresponding oxy oxygen atom.

7. Process for producing halogen-substituted alkyl phosphates containing at least one oxyhydrocarbon group, which comprises reacting in the presence as catalyst of a halide of the class consisting of the halides of titanium and zirconium, an oxirane of the formula

wherein R is selected from the class consisting of hydrogen, and the alkyl, chlorine-substituted and bromine-substituted alkyl radicals, with a derivative of a phosphorus oxyhalide wherein each halogen has an atomic weight between 35 and 80, and wherein one to two such halogen atoms are replaced by a corresponding number of monovalent oxy-substituted hydrocarbon residues, each connected with the phosphorus atom through an oxy oxygen atom.

8. Process for producing halogen-substituted amidophosphates, which comprises reacting an oxirane of the formula

wherein R is selected from the class consisting of hydrogen, the alkyl groups and the chlorine-substituted and bromine-substituted alkyl groups, with an amidophosphoryl halide at a temperature within the range between around 20° C. and 100° C., in the presence of a metal halide of the class consisting of the halides of titanium and zirconium.

9. Process for producing halogen-substituted alkyl amidophosphates, which comprises reacting, at temperatures between 20° C. and 100° C., in the presence as catalyst of a metal halide of the class consisting of the halides of titanium and zirconium, an oxirane of the formula

wherein R is selected from the class consisting of hydrogen and the alkyl, chlorine-substituted and bromine-substituted alkyl radicals, with a derivative of a phosphorus oxyhalide wherein each halogen has an atomic weight between 35 and 80, and wherein one to two of such halogen atoms are replaced by a corresponding number of amido radicals, each of the latter having at least one of the hydrogen atoms replaced by an aryl radical.

10. Process for producing halogen-substituted N-alkyl-substituted amidophosphates, which comprises reacting at a temperature within the range between about 20° C. and about 100° C. in the presence of a metal halide selected from the class consisting of the halides of titanium and zirconium, an oxirane of the formula

wherein R is selected from the class consisting of hydrogen, the alkyl groups and the chlorine-substituted and bromine-substituted alkyl groups, with a derivative of a phosphorus oxyhalide wherein each halogen has an atomic weight between 35 and 80, and wherein one to two of such halogens are replaced by a corresponding number of amido radicals, each of the latter having at least one of the hydrogen atoms replaced by an alkyl radical.

WILLIAM M. LANHAM.

REFERENCES CITED

The following references are of record in the file of this patent:

UNITED STATES PATENTS

| Number | Name | Date |
| --- | --- | --- |
| 1,936,985 | Lommel | Nov. 28, 1933 |
| 2,157,164 | Daly et al. | May 9, 1939 |

FOREIGN PATENTS

| Number | Country | Date |
| --- | --- | --- |
| 729,966 | France | Aug. 4, 1932 |
| 591,632 | Great Britain | Aug. 25, 1947 |

OTHER REFERENCES

Kabachnik et al.: Chem. Abstr., vol. 42, column 4132 (1948), abstract of article in Bull. Acad. Sci. U. R. S. S., Classe Sci. Chim., 1947, pp. 97–100.